Sept. 12, 1933.  M. F. FITZGERALD  1,926,938
ELECTRIC TOASTER
Filed Sept. 17, 1930
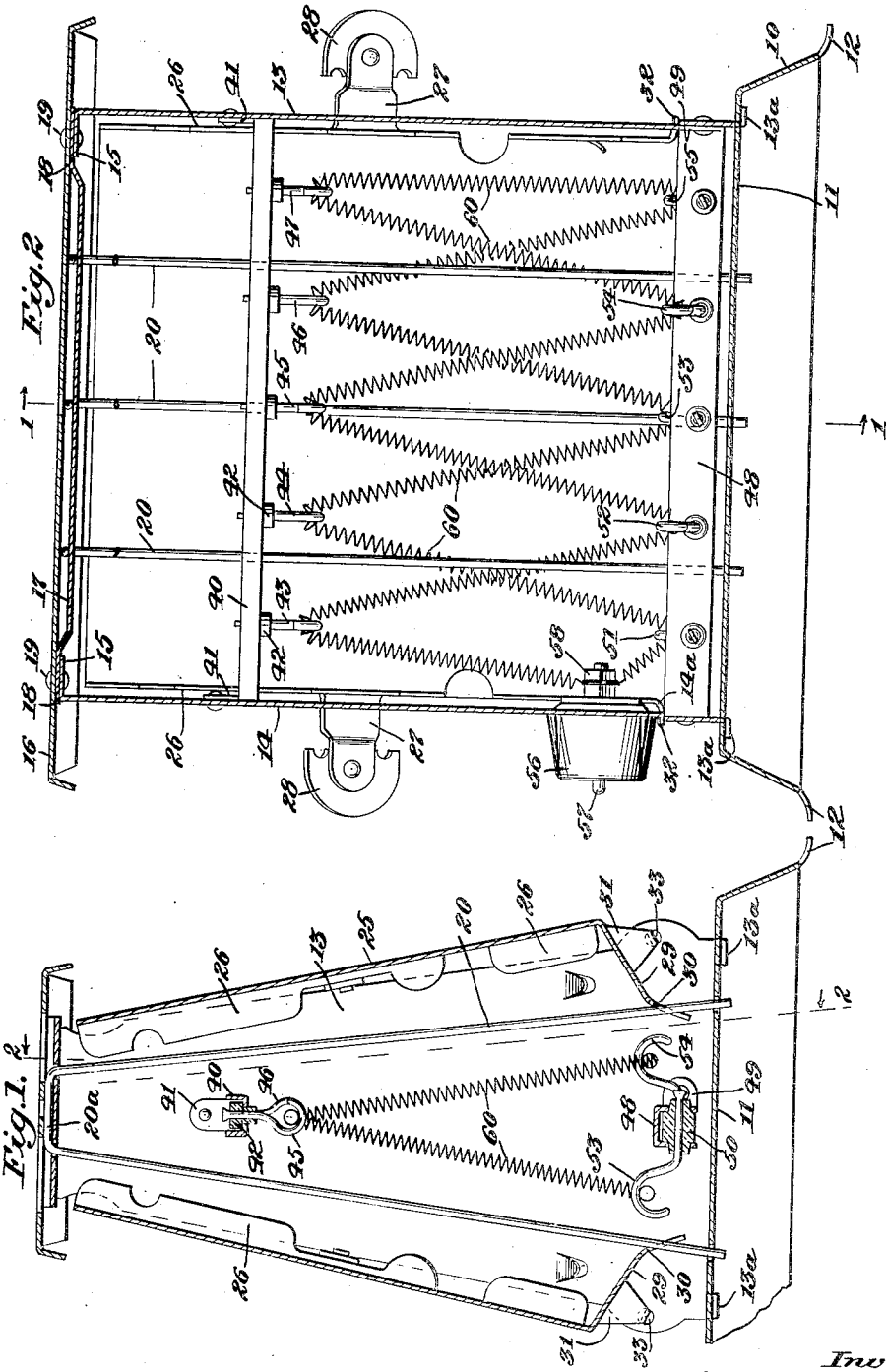

Patented Sept. 12, 1933

1,926,938

UNITED STATES PATENT OFFICE 1,926,938

ELECTRIC TOASTER

Maurice F. Fitzgerald, Winsted, Conn., assignor to The Fitzgerald Manufacturing Company, Torrington, Conn., a corporation of Connecticut Application September 17, 1930
Serial No. 482,596

5 Claims. (Cl. 219—19)

This invention relates to electric toasters, and more particularly concerns a duplex toaster in which the bread slice is held in an upright position during toasting.

One of the objects of the present invention is to provide a simple and compact assembly in which the heating element is supported with portions adjacent each of the bread holders.

Another object of the invention is to provide a support for the heating element and an arrangement of this heating element itself, whereby no independent return connection is required.

A further feature of the invention is the provision of a characteristic insulating support mounting for the heating element.

With these and other objects in view as will appear in the course of the following specification and claims, an illustrative form of the construction is shown in the accompanying drawing in which:

Fig. 1 is a transverse vertical sectional view substantially on line 1—1 of Fig. 2.

Fig. 2 is a longitudinal sectional view substantially on line 2—2 of Fig. 1.

In the drawing, the toaster is shown to comprise a base 10 formed by dishing or flanging a plate so that the central portion of the plate provides a floor 11, while the edges provide the walls of the base and the feet 12. End walls 13, 14, are fixed to the base by providing the downwardly projecting tabs 13a, which pass through suitable apertures in the floor 11 and are clinched therebeneath. These end walls 13, 14 are constructed with upwardly convergent side edges (see Fig. 1) and are bent inwardly at their upper ends to form the flanges 15. A top 16 is likewise formed of stamped sheet metal. A top sub-plate 17 extends substantially parallel to the top for a major portion of its length, but has the upwardly offset ends 18 which are received between the inturned ends 15 of the walls 13, 14, and the top 16. Securing means such as rivets are employed to fix the three elements together at their junctions.

Guard wires 20 are provided of inverted U-shaped form, the legs being convergent upwardly. The bight 20a of each wire guard is located above the sub-plate 17, the latter being provided with spaced apertures for the passage of the legs of the guard wires, (Fig. 1). The floor 11 is likewise provided with spaced apertures to receive the lower ends of the guard wires, so that in the final assembly the guard wires are held fixedly against vertical, longitudinal or lateral movement.

A holder for a slice of bread is provided at each side of the toaster. Each holder comprises a sheet member 25 having the vertical side edges curled inwardly as at 26 to prevent movement of the bread along the length of the toaster. These edges are preferably located inside of the walls 13, (Fig. 2). A portion of each such edge, however, is extended beyond the end walls 13, 14 to provide the lugs 27 for supporting the finger pieces 28 which may be of fiber or other heat insulating material. It will be noted that when the bread holder is empty, the lugs 27 may engage the edges of the end members to determine the upper and inner position of the respective holder.

Each of the holders likewise is provided at its bottom edge with an inwardly bent shelf 29, which is provided with notches 30 opposite the respective guard wires 20. At the ends, each shelf 29 is provided with downwardly extending members 31 which have small outturned tips 32 which fit in aligned holes 33 in the end members 13, 14 and thus form pivot supports for the bread holders.

In the upper part of the toaster, a bar 40 extends across from end wall 13 to end wall 14. This bar is preferably formed as a channel of sheet metal with the upturned ends 41, which are riveted to the respective end walls. Spaced holes in the channel receive the insulating members 42 which may be of any suitable heat resistant insulating material and are illustrated as formed with an enlarged upper end, a reduced lower end, and a central aperture. Metal hooks 43, 44, 45, 46, 47, extend downwardly from these insulating members and have their shanks passed through the central apertures and clinched above the insulators whereby the hooks are held fixedly in vertical position.

Adjacent the floor 11, a similar inverted channel brace 48 is provided which extends likewise between the end walls and has at each end a laterally outturned portion 49 which is riveted to the respective end wall. The end wall is slit and displaced outwardly so that the upper edge of the channel 48 is located beneath and close against the slit edge as at 14a (Fig. 2). Insulating members of similar material to those described above, and having horizontal passages therethrough, are located within the channel member 48. Each insulating member has an enlarged central portion and reduced ends which pass through aligned apertures in the opposite legs of the channel member 48. Preferably, the insulating members are located in the partly formed channel and then the latter is bent into its channel shape to hold the insulators in position. Each of the insulating members 50 receives a hook, alternate hooks being directed in opposite directions so that hooks 51, 53 and 55 are located at the left hand side of the channel member 48 in Fig. 1, while the hooks 52, 54 are located on the right hand side. The shanks of these hooks are passed through the insulators and clinched to hold them in definite position.

A protecting hood 56 of any suitable type, surrounds the prongs 57 for the electric connections, these prongs terminating in the binding post 58 within the toaster.

A heating element comprising a wire helix 60 is passed over the insulated upper supports 43, 45, 47, 46, 44, and over the similarly insulated lower supports 52, 54, 55, 53, 51 in zigzag form. Passing from one binding post 58, this electrical heating element extends upwardly around the upper support 43, then downwardly around the lower support 52, upwardly to the support 45, down to the support 54 and up to the support 47: thus forming a zigzag heating grid which is located substantially in a plane parallel to the position of the bread slice being toasted and located in the right hand holder in Fig. 1. From the support 47 the heating element 60 passes downwardly and around the lower support 55, up to the support 46, down to the support 53, up to the support 44, down to the support 51 and back to the other binding post 58. Thus the return electric connection from the rear end of the toaster likewise comprises a zigzag grid heating element which is maintained separate from the first grid although the upper supports are in general alignment one with another. This second grid lies substantially in a plane parallel to the bread slice being toasted in the left hand holder of Fig. 1. It will be noted that the upper insulated supports are arranged in a longitudinal row and that alternate supports are employed by the respective zigzag grids. Further, the lower supports are staggered with respect to one another and comprise alternately a hook extending toward the right and one extending toward the left in Fig. 1; while a lower hook 54 for the right hand grid of Fig. 1 lies substantially in the same vertical plane as an upper hook 46 for the left hand grid in Fig. 1, etc.

Having thus described my invention, what I claim as new and desire to secure protection by Letters Patent for, is:

1. In an electric toaster, a base, end walls fixed on said base, bread holders pivotally mounted on horizontal axes, longitudinally spaced upper insulated supports, two series of longitudinally spaced lower supports, said series being laterally spaced from one another and the individual supports of each series being staggered with respect to the supports of the other, and a heater element arranged around said insulated supports in zigzag form from one end of said toaster to the other and back again.

2. In an electric toaster, a base, end walls fixed to said base, bread holders mounted on horizontal axes, a plurality of longitudinally aligned and spaced insulated supports, two series each including a plurality of longitudinally aligned and insulated supports, both of said series being vertically offset from said first plurality, the insulated supports of one series being staggered with respect to those of the other, and a heater element arranged around said supports in zigzag form over the supports of one of said series and over alternate supports of said first plurality, and thence back over the supports of the other series and the interposed supports of said first plurality.

3. In an electric toaster, a frame, a row of alined upper heater supports, two rows of lower heater supports, each row being alined substantially parallel to said alined upper supports, said lower rows being laterally spaced from one another and having together substantially the same number of individual supports as in said upper row, a heater element mounted substantially in two planes in zigzag form in each and supported at top and bottom in one plane on alternate supports of said upper row and on the supports of one said lower row and in the other plane on the intervening supports of said upper row and on the supports of the other said lower row, and bread holders for supporting slices of bread opposite each said plane.

4. In an electric toaster, a frame including upper and lower members mounted substantially in a vertical plane, individual insulated heater supports mounted on said members and providing a longitudinal alined upper row and two longitudinally alined and laterally spaced lower rows, a heater element mounted substantially in two planes in zigzag form in each and supported at top and bottom in one plane on alternate supports of said upper row and on the supports of one said lower row and in the other plane on the intervening supports of said upper row and on the supports of the other said lower row, and bread holders for supporting slices of bread opposite each said plane.

5. In an electric toaster, a frame including upper and lower members mounted substantially in a vertical plane, individual insulated heater supports mounted on said members and providing a longitudinal alined upper row and two longitudinally alined and laterally spaced lower rows, each support of a lower row being alined in a transverse vertical plane with a support of said upper row, a heater element mounted substantially in two planes in zigzag form in each and supported at top and bottom in one plane on alternate supports of said upper row and on the supports of one said lower row and in the other plane on the intervening supports of said upper row and on the supports of the other said lower row, and bread holders for supporting slices of bread opposite each said plane.

MAURICE F. FITZGERALD.